(12) United States Patent
Sung

(10) Patent No.: US 9,185,263 B2
(45) Date of Patent: *Nov. 10, 2015

(54) IMAGE SCANNING APPARATUS AND METHOD

(71) Applicant: SAMSUNG ELECTRONICS CO., LTD., Suwon-si, Gyeonggi-do (KR)

(72) Inventor: Byung-jun Sung, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/528,279

(22) Filed: Oct. 30, 2014

(65) Prior Publication Data

US 2015/0092251 A1    Apr. 2, 2015

Related U.S. Application Data

(63) Continuation of application No. 13/613,518, filed on Sep. 13, 2012, now Pat. No. 8,885,228.

(30) Foreign Application Priority Data

Sep. 27, 2011 (KR) .................. 10-2011-0097592

(51) Int. Cl.
H04N 1/04 (2006.01)
H04N 1/401 (2006.01)
H04N 1/40 (2006.01)
H04N 1/047 (2006.01)

(52) U.S. Cl.
CPC ............... *H04N 1/401* (2013.01); *H04N 1/047* (2013.01); *H04N 1/40* (2013.01)

(58) Field of Classification Search
None
See application file for complete search history.

(56) References Cited

U.S. PATENT DOCUMENTS

| | | |
|---|---|---|
| 2004/0004177 A1 | 1/2004 | Uchiyama |
| 2004/0223194 A1* | 11/2004 | Naito et al. .................. 358/497 |
| 2007/0216962 A1 | 9/2007 | Inage |
| 2008/0074716 A1* | 3/2008 | Yoshihisa .................... 358/497 |

FOREIGN PATENT DOCUMENTS

JP    2002-305633    10/2002

OTHER PUBLICATIONS

Office Action issued Dec. 19, 2013 in co-pending U.S. Appl. No. 13/613,518.
Notice of Allowance issued Jul. 14, 2014 in co-pending U.S. Appl. No. 13/613,518.
U.S. Appl. No. 13/613,518, filed Sep. 13, 2012, Byung-jun Sung, Samsung Electronics Co., Ltd.

* cited by examiner

*Primary Examiner* — Vincent Rudolph
*Assistant Examiner* — Michael Burleson
(74) *Attorney, Agent, or Firm* — Staas & Halsey LLP

(57) ABSTRACT

An image scanning apparatus is provided. The image scanning apparatus includes an image sensor configured to scan a manuscript, a sensor driving unit configured to allow the image sensor to move on a scanning path, a driving control unit configured to generate a driving signal for the sensor driving unit, and a control unit configured to control the image sensor to scan the shading patch during moving to scan the manuscript.

18 Claims, 7 Drawing Sheets

IMAGE SCANNING APPARATUS AND METHOD

CROSS-REFERENCE TO RELATED APPLICATIONS

This application is a continuation application of U.S. patent application Ser. No. 13/613,518, filed Sep. 13, 2012, and claims priority from Korean Patent Application No. 10-2011-0097592, filed on Sep. 27, 2011, in the Korean Intellectual Property Office, the disclosure of which is incorporated herein by reference in its entirety.

BACKGROUND

1. Field

Apparatuses and methods consistent with exemplary embodiments relate to an image scanning apparatus and method, and more particularly, to an image scanning apparatus and method capable of scanning a shading patch during moving to scan a manuscript.

2. Description of the Related Art

Image scanning apparatuses are an apparatus which scans an original image of documents, pictures, films, or the like and converts the scanned original image into digital data. The digital data may be displayed on a monitor of a computer or printed by a printer, thereby being created as an output image. As an example of the image scanning apparatus, there are scanners, copiers, facsimiles, and multifunction peripherals (MFPs) configured to implement functions of the scanners, the copiers, and the facsimiles multiply through one apparatus.

In the general image scanning apparatus, distortion is caused in an image signal generated in an image sensor due to deviation or unbalance in an amount of light generated in a light source module. The phenomenon is referred to as a shading phenomenon. An image signal which is a different type from an actual manuscript to be printed may be generated due to the shading phenomenon. Therefore, the image scanning apparatuses need to correct the shading phenomenon representing the image signal.

Thereby, the image scanning apparatus of the related art performs a shading correction using a shading patch (or a white reference sheet) provided in one side of a flatbed. Hereinafter, the shading correction operation of the related art will be described with reference to FIG. 7.

FIG. 7 is a view illustrating the shading correction method in the related art.

Referring to FIG. 7, first, when a scan command is received from a user, it is determined whether or not a shading correction is required currently. When it is determined that the shading correction is required, an image sensor 50 moves to a shading patch region to scan a shading patch 20 provided in one side of a flatbed and performs a scanning operation on the shading patch 20. When the scanning operation on the shading patch is completed, the image sensor 50 generates reference shading data using scan data for the shading patch and moves to a home region 10.

When the reference shading data is generated using the scan data for the shading patch, the image sensor 50 moves to a manuscript region 30 in which a manuscript is placed to scan the manuscript, performs an scanning operation on the manuscript, and performs a shading correction on the scan data for the manuscript using the previously generated reference shading data.

In the related art, a moving operation of the image sensor is ineffective in that movement of the image sensor for generating the reference shading data and movement of the image sensor for scanning the manuscript are performed dualistically. More specifically, since the image sensor moves to the home region after the shading operation and then moves from the home region to the manuscript region again, the scanning operation when the shading correction is required takes a long time.

Since it takes a long time to generate the reference shading data for the shading correction, the image scanning apparatus in the related art generates the reference shading data on a set time interval and performs the shading correction using the previously generated reference shading data. However, since deviation or unbalance in an amount of light generated from the light source module becomes different every scanning operation, it is preferable that the process of generating the reference shading data be performed for each scanning operation.

However, in the related art, as described above, since the process of generating the reference shading data is not performed for each scanning operation, it is impossible to provide the same quality for every scan image.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiment provide an image scanning apparatus and method capable of scanning a shading patch during moving to scan a manuscript.

According to an aspect of an exemplary embodiment, there is provided an image scanning apparatus including a shading patch on a scanning path. The image scanning apparatus may include: an image sensor configured to scan a manuscript; a sensor driving unit configured to allow the image sensor to move on a scanning path; a driving control unit configured to generate a driving signal for the sensor driving unit; and a control unit configured to control the image sensor to scan the shading patch during moving to scan the manuscript.

The image scanning apparatus may further include a storage unit configured to store scanning data for the shading patch as reference data.

The image scanning apparatus may further include an image processing unit configured to shading-correct scan data for the manuscript using scan data for the shading patch.

The image scanning apparatus may further include a storage unit configured to store the shading-corrected scan data for the manuscript.

The sensor driving unit may sequentially move the image sensor to a home region, a shading patch region, and a manuscript region.

The driving control unit may generate the driving signal to allow the image sensor to move at different speeds in the shading patch region and the manuscript region.

The driving control unit may provide different driving currents to the sensor driving unit in the shading parch region and the manuscript region.

The image scanning apparatus may further include a storage unit configured to store a plurality of speed tables corresponding to a plurality of sections on the scanning path, respectively. The driving control unit may generate the driving signal using the plurality of speed tables during moving of the image sensor.

Each of the speed tables may include any one selected from the group consisting of a first acceleration table configured to be increased to a preset first speed in units of a preset speed, a first constant velocity table configured to maintain the first speed constantly, a second acceleration table configured to be increased to a preset second speed faster than the first speed in units of a preset speed, and a second constant velocity table configured to maintain the second speed constantly.

The driving control unit may be configured to generate the driving signal using the first acceleration table when the image sensor moves from the home region to the shading patch region; generate the driving signal using the first constant velocity table when the image sensor moves in the shading patch region; generate the driving signal using the second acceleration table when the image sensor moves from the shading patch region to the manuscript region; and generate the driving signal using the second constant velocity table when the image sensor moves in the manuscript region.

According to another aspect of an exemplary embodiment, there is provided a method of scanning an image in an image scanning apparatus including a shading patch on a scanning path. The method may include: generating a driving signal configured to move an image sensor; moving the image sensor on a scanning path according to the generated driving signal; scanning a shading patch during moving to scan a manuscript; and scanning the manuscript.

The method may further include storing scan data for the shading patch as reference data.

The method may further include shading-correcting scan data for the manuscript using scan data for the shading patch.

The method may further include storing the shading-corrected scan data for the manuscript.

The moving may include sequentially moving the image sensor to a home region, a shading patch region, and a manuscript region.

The generating the driving signal may include generating the driving signal configured to allow the image sensor to move at different speeds in the shading patch region and the manuscript region.

Alternatively, the generating the driving signal may include generating the driving signal having different driving currents in the shading patch region and the manuscript region.

The generating the driving signal may include generating the driving signal using a plurality of pre-stored speed tables corresponding to a plurality of sections on the scanning path.

Each of the speed table may include any one selected from the group consisting of a first acceleration table configured to be increased to a preset first speed in units of a preset speed, a first constant velocity table configured to maintain the first speed, a second acceleration table configured to be increased to a preset second speed faster than the first speed in units of a preset speed, and a second constant velocity table configured to maintain the second speed.

The generating the driving signal may include generating the driving signal using the first acceleration table when the image sensor moves from the home region to the shading patch region, generating the driving signal using the first constant velocity table when the image sensor moves in the shading patch region, generating the driving signal using the second acceleration table when the image sensor moves from the shading patch region to the manuscript region, and generating the driving signal using the second constant velocity table when the image sensor moves in the manuscript region.

Additional aspects and advantages of the exemplary embodiments will be set forth in the detailed description, will be obvious from the detailed description, or may be learned by practicing the exemplary embodiments.

BRIEF DESCRIPTION OF THE DRAWINGS

The above and/or other aspects will be more apparent by describing in detail exemplary embodiments, with reference to the accompanying drawings, in which.

DETAILED DESCRIPTION

Figure 1:
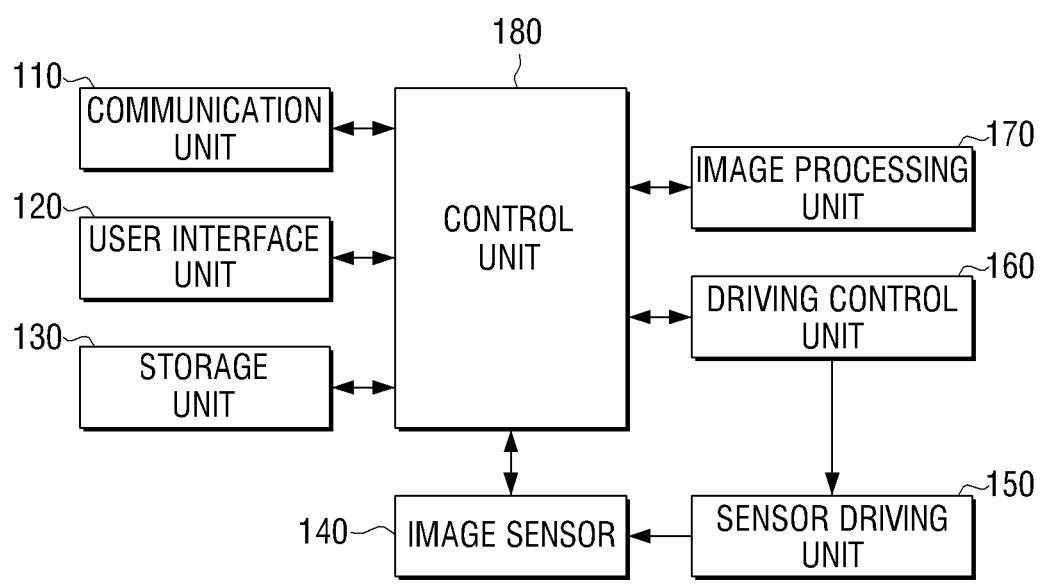
FIG. 1 is a view illustrating a configuration of an image scanning apparatus according to an exemplary embodiment.

Reference will now be made in detail to the embodiments, examples of which are illustrated in the accompanying drawings, wherein like reference numerals refer to the like elements throughout. The embodiments are described below to explain the present invention by referring to the figures.

Hereinafter, exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

FIG. 1 is a view illustrating a configuration of an image scanning apparatus according to an exemplary embodiment.

Referring to FIG. 1, the image scanning apparatus 100 includes a communication interface unit 110, a user interface unit 120, a storage unit 130, an image sensor 140, a sensor driving unit 150, a driving control unit 160, an image processing unit 170, and a control unit 180.

The communication interface unit 110 may be connected to a host apparatus (not shown) of a personal computer, a laptop computer, a personal digit assistant (PDA), a digital camera, or the like and transmit scan data scanned by the image scanning apparatus 100 to the host apparatus. Specifically, the communication interface unit 110 may be configured to connect the image scanning apparatus 100 to an external apparatus and may be connected to a terminal through a local area network (LAN) and Internet or through a universal serial bus (USB) port.

The user interface unit 120 receives a scan command from a user. The user interface unit 120 includes a plurality of function keys which can set or select various functions supported by the image scanning apparatus 100 by the user and displays various pieces of information provided from the image scanning apparatus 100. The user interface unit 120 may be embodied with a device, in which an input and an output are simultaneously embodied, such as a touch pad or a device in which a mouse and a monitor are combined.

Here, the scan command may be a command for only a scanning operation or a command such as a scan-to-server command, a scan-to-digital living network alliance (DLNA)

command, and a scan-to-cloud command, which transmit a scanned work to a specific server. In addition, when the image scanning apparatus 100 is an MFP capable of performing a printing operation and a copying operation, the scan command may be a copy command using a scan function. Meanwhile, the exemplary embodiment has illustrated that the scan command is received through the user interface unit 120, it may be embodied that the scan command is received from a host apparatus (not shown) through the communication interface unit 110.

The storage unit 130 may store scan data for a shading patch as reference shading data. Specifically, the storage unit 130 may store the reference shading data generated using the scan data for the shading patch scanned in the image processing unit 170 to be described later. The reference shading data may be stored in a shading data buffer configured to store only the reference shading data. Here, the shading data buffer may have a memory size of 12 KB.

The storage unit 130 may store scan data which is scanned on a manuscript by the image sensor 140. The storage unit 130 may store the scan data which is scanned on the manuscript and then shading-corrected in the image processing unit 170 to be described later. The scan data may be stored in an image file format type such as jpg, bmp, or tif.

The storage unit 130 stores a plurality of speed tables corresponding to a plurality of sections on a scanning path. Specifically, the storage unit 130 may store the plurality of speed tables used in moving the image sensor on the scanning path. For example, the speed tables may include a first acceleration table configured to be increased to a preset first speed in units of preset speed, a first constant velocity table configured to maintain the first speed constantly, a second acceleration table configured to be increased to a preset second speed faster than the first speed in units of preset speed, and a second constant velocity table configured to maintain the second speed constantly. Here, the speed table which is used in forward driving of the image sensor 140 has been illustrated, but the storage unit 130 may store a speed table used in reverse driving of the image sensor 140.

The storage unit 130 may be embodied with a storage medium in the inside of the image scanning apparatus 100, an external storage medium such as a removable disk including a USB memory, a storage medium connected to the host apparatus, or a web server though a network.

The image sensor 140 scans the shading patch. The scan image scanned for the shading patch is transmitted to the image processing unit 170 to be described later. The image sensor 140 scans a manuscript. The scan image scanned for the manuscript is also transmitted to the image processing unit 170 to be described later and the scan image for the manuscript may be shading-corrected. The image sensor may be disposed under a flatbed as shown in FIG. 2.

The sensor driving unit 150 moves the image sensor 140 on the scanning path. Specifically, the sensor driving unit 150 includes a mechanism structure and a motor configured to move the image sensor 140 on the scanning path. The image sensor 140 is mounted on one side of the mechanism structure and a light source module configured to scan the manuscript is also mounted on the mechanism structure. Meanwhile, the above-described exemplary embodiment has illustrated that only the image sensor and light source module are mounted on the mechanism structure, but it may be embodied that some parts or all parts of the image scanning apparatus 100 are disposed in the mechanism structure.

Figure 2:
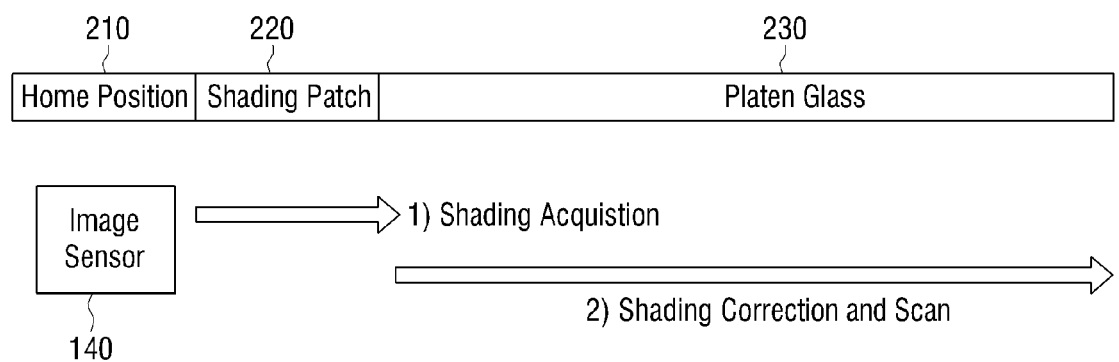
FIG. 2 is a view illustrating a scanning path according to an exemplary embodiment.

The sensor driving unit 150 allows the image sensor 140 to sequentially move to a home region, a shading patch region, and a manuscript region on the scanning path under the flatbed using an internal motor thereof, as shown in FIG. 2. The sensor driving unit 150 may drive the image sensor 140 with a constant velocity or acceleration according to a driving signal of the driving control unit 160 to be described later and drive the image sensor 140 in a forward or reverse direction according the input driving signal. Meanwhile, the image sensor 140 and the sensor driving unit 150 may be embodied with one sensor module.

The driving control unit 160 generates the driving signal for the sensor deriving unit 150. Specifically, the driving control unit 160 generates driving signal configured to enable the image sensor to move at different speeds in the shading patch region and the manuscript region using the plurality of speed tables stored in the storage unit 130.

Figure 3:
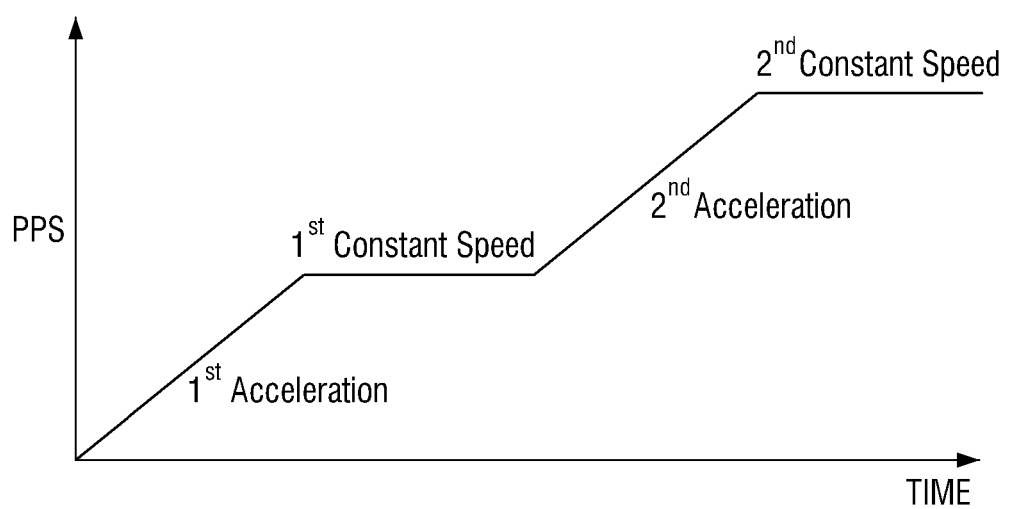
FIGS. 3 to 5 are views illustrating an operation of a driving control unit of FIG. 1.
Figure 5:
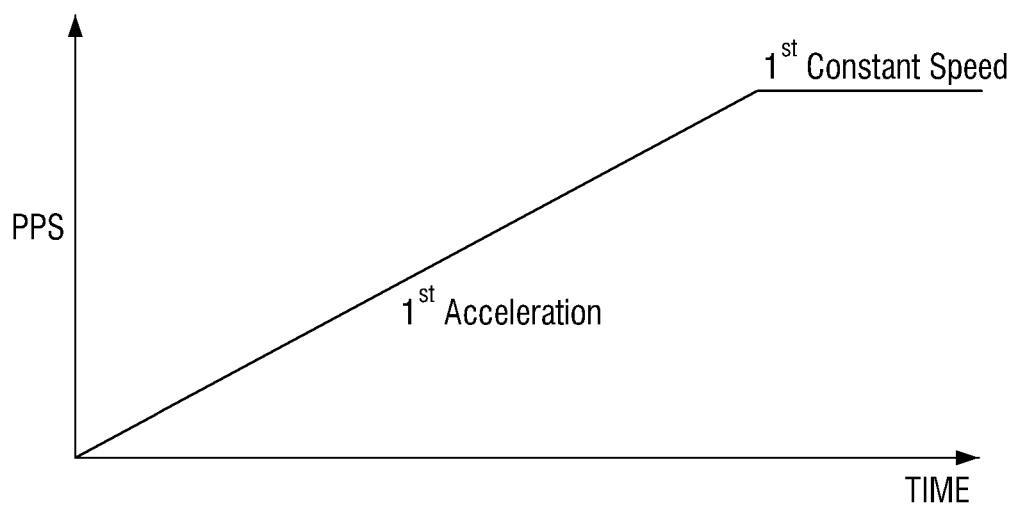

More specifically, in order to allow the sensor driving unit 150, that is, the image sensor 140 moves at speed as shown in FIG. 3, the driving control unit 160 generates the driving signal using a first acceleration table when the image sensor 140 moves from the home region to the shading patch region; generates the driving signal using the first constant velocity table when the image sensor 140 moves in the shading patch region; generates the driving signal using the second acceleration table when the image sensor 140 moves from the shading patch region to the manuscript region; and generates the driving signal using the second constant velocity table when the image sensor 140 moves in the manuscript region. The driving control unit 160 may be embodied to be configured to generate the driving signal to allow the image sensor to move at speed as shown in FIG. 5.

Figure 4:
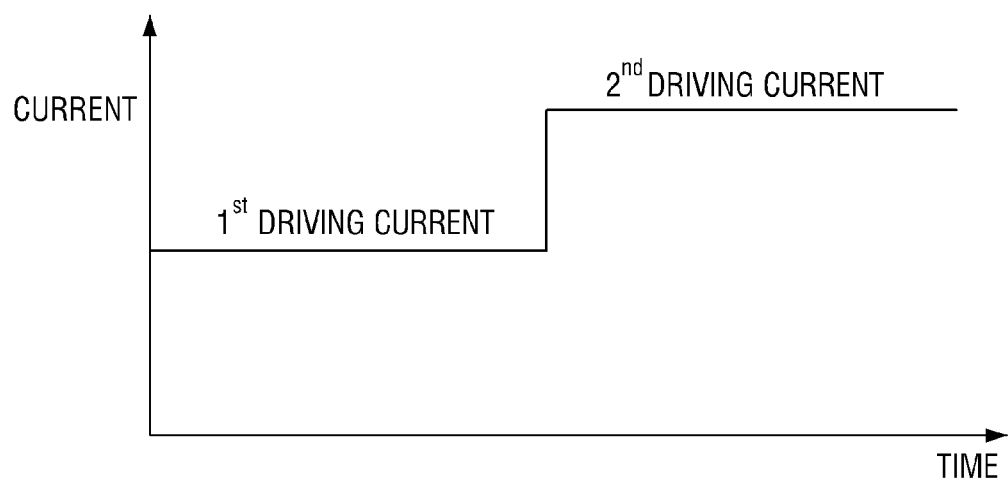

Meanwhile, the driving control unit 160 may provides different driving currents to the sensor driving unit 150 in the shading patch region and the manuscript region. Specifically, when the image sensor is driven using a step motor and the same current is provided to the step motor, the step motor is likely to be stepped out due to the lack of a motor torque in high acceleration. Therefore, the driving control unit 160 may provides the different driving currents to the sensor driving unit 150 in the shading patch region and the manuscript region as shown in FIG. 4.

The image processing unit 170 may generate reference shading data using the scan data for the shading patch. More specifically, the image processing unit 170 receives scan images in units of line for the shading patch from the image sensor 140 and determines whether or not the received scan images are effective data when the scan images for all lines (for example, 64 lines) are received. When it is determined that the received scan images are effective data, the image processing unit 170 may generates the reference shading data using an average value of the scan images in units of line. The generated reference shading data may be stored in the storage unit 130.

The image processing unit 170 shading-corrects the scan data for the manuscript using the scan data for the shading patch. Specifically, the image processing unit 170 may shading-correct the scan data for the manuscript using the reference shading data generated by the scan data for the shading data.

Meanwhile, the image processing unit 170 may have the same processing speed as a scanning speed of the image sensor 140. Specifically, in order to real-time process the scanned image, a shading-correction speed for the image scanned in the image process unit 170 may be equal to a scan speed in the image sensor 140, that is, a scan speed of one line.

The control unit 180 controls each configuration of the image scanning apparatus 100. Specifically, when the control unit 180 receives a scan command through the user interface unit 120 or the communication interface unit 110, the control unit 180 may control the sensor driving unit 150 and the driving control unit 160, thereby allowing the image sensor 140 to move on the scanning path. When the image sensor 140 is positioned below the shading patch while the image sensor is moving, the control unit 180 may control the image sensor 140 to scan the shading patch. The control unit 180 may control the image processing unit 170 so that the scan data for the manuscript is shading-corrected using the scan data for the shading patch.

Thereby, the image scanning apparatus 100 according to the exemplary embodiment performs a scanning operation for the shading patch in the moving process for scanning a manuscript so that a scanning operation can be performed faster. Since there is no additional time consumption in the process of generating the reference shading data, the shading correction for the image scanned in a real time can be performed in a low-speed scan as well as in a high-speed scan.

It has been described in FIG. 1 that only the step motor is used as a motor for driving the image sensor, but it may be embodied to use a direct current (DC) motor, a brushless direct current (BLDC) motor, or the like as a motor for driving the image sensor.

FIG. 2 is a view illustrating a scanning path according to an exemplary embodiment.

Referring to FIG. 2, a home region 210 in which the image sensor is positioned when a scan operation is not performed, a shading patch region 220 in which a shading patch is positioned, and a manuscript region 230 in which a manuscript is placed are arranged in a flatbed. FIG. 1 illustrates the home region 210, the shading patch region 220, and the manuscript region 230 are in contact with one another, but it may be embodied that the home region 210, the shading patch region 220, and the manuscript region are spaced apart from one another at a specific distance.

Therefore, when the scan command is input, the image sensor 140 moves in the order of the home region 210, the shading patch region 220, and the manuscript region 230. When a scanning operation for one surface of a manuscript is completed, the image sensor 140 reversely moves in the order of the manuscript region 230, the shading patch region 220, and the home region 210.

It has been described in FIG. 2 that the scanning path is in the order of the home region 210, the shading patch region 220, and the manuscript region 230, but it is embodied that the shading patch region 220 may be positioned on the right side of the manuscript region 230. In this case, the scanning path may be in the order of the home region 210, the manuscript region, and the shading patch region.

FIGS. 3 to 5 are views illustrating an operation of the driving control unit of FIG. 1.

Referring to FIG. 3, the driving control unit 160 may generate the driving signal to allow the image sensor 140 to move at acceleration twice and at constant velocity twice. Specifically, as shown in FIG. 3, when the image sensor 140 moves from the home region 210 to the shading patch region 220, the driving control unit 160 may generate the driving signal to allow the image sensor 140 to move with a first acceleration in which a moving speed is increased in units of preset speed. It has been described that the driving signal is generated to allow the image sensor 140 to move with a constant acceleration in the first acceleration section, but it may be embodied that the driving signal is generated to allow the image sensor to move with an acceleration in various manner (for example, an exponential acceleration manner). In addition, the acceleration manner can be optimized by a manufacturer so that the image sensor can stably move.

When the image sensor 140 moves to the shading patch region 220, the driving control unit 160 may generate the driving signal so that the image sensor 140 can be move with the first constant velocity in the shading patch region 220.

When the driving control unit 140 moves from the shading patch region 220 to the manuscript region 230, the driving control unit 160 may generate the driving signal to allow the image sensor 140 to move with the second acceleration in which a speed is increased in units of preset speed. It has been described that the driving signal for allowing the image sensor to move with a constant acceleration in the second acceleration section, it may be embodied that the driving signal is generated to allow the image sensor to move with an acceleration in various manner (for example, an exponential acceleration manner).

When the image sensor 140 moves to the manuscript region 230, the driving control unit 160 may generate the driving signal to allow the image sensor 140 to move with a second constant velocity.

Meanwhile, when the image sensor is accelerated in two stages as described above, if the same current is provided to a motor, the motor is likely to be stepped out due to the lack of the motor torque required in the second acceleration. Therefore, the driving control unit 160 may provide different driving currents to the sensor driving unit 150 in the shading patch region and the manuscript region as shown in FIG. 4.

It has been described that the image sensor 140 moves with a constant velocity in the shading patch region and the manuscript region, but it may be embodied that the image sensor 140 moves with a constant velocity only in the manuscript region as shown in FIG. 5.

Figure 6:
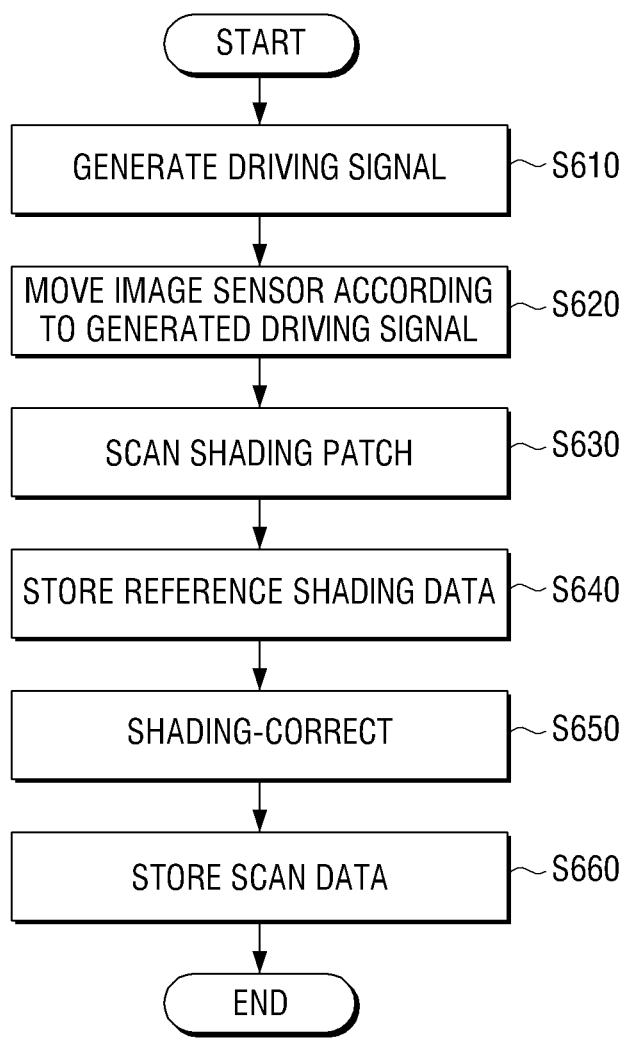
FIG. 6 is a flowchart illustrating an image scanning method according to an exemplary embodiment.
Figure 7:
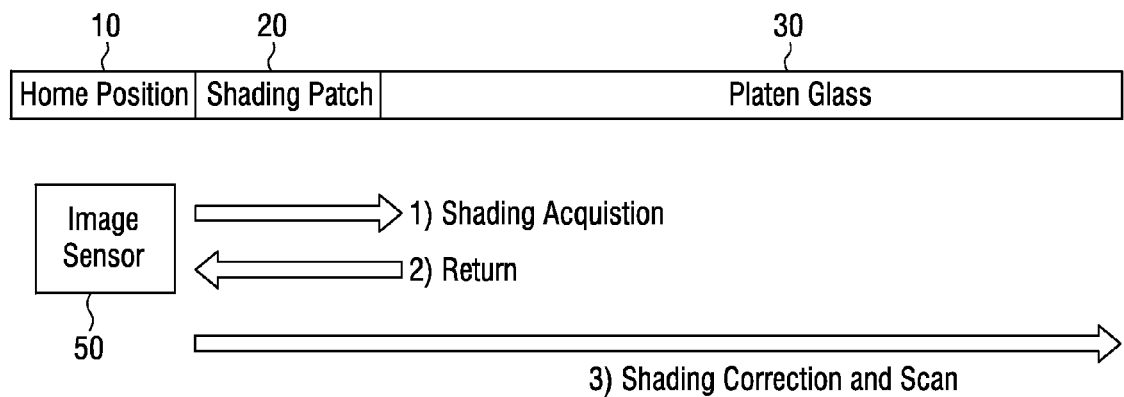
FIG. 7 is a flowchart illustrating a shading correction method in the related art.

FIG. 6 is a flowchart illustrating an image scanning method according to an exemplary embodiment.

First, when a scan command is received from a user, a driving signal configured to allow the image sensor to move is generated (S610). Specifically, the driving signal configured to allow the image sensor to move at different speeds in the shading patch region and the manuscript region may be generated using a plurality of pre-stored speed tables.

The image sensor 140 moves on the scanning path according to the generated driving signal (S620). More specifically, as shown in FIG. 2, the image sensor 140 sequentially moves to the home region, the shading patch region, and the manuscript region on the scanning path below the flatbed.

When the image sensor 140 moves and is positioned below the shading patch region, the image sensor 140 scans a shading patch (S630). When the shading patch is scanned, reference shading data may be generated using the scan data for the shading patch. Specifically, scan images in units of line for the shading patch may be sequentially received and the reference shading data may be generated using an average of the sequentially received scan images. The generated reference shading data may be stored (S640).

When the image sensor 140 is positioned below the manuscript region, the image sensor 140 scans the manuscript. A shading-correction on the scan data for the manuscript may be performed using the scan data for the shading patch (S650). Specifically, the shading-correction on the scan data for the manuscript may be performed using the reference shading data generated by the scan data for the shading patch. The shading-corrected scan data for the manuscript may be stored (S660).

The image scanning method of the exemplary embodiment performs image scanning for the shading patch during a moving process for scanning the manuscript so that the faster scanning operation can be performed. Since there is no additional time consumption in the process of generating the reference shading data, the shading correction for an image scanned in a real time can be performed in a low-speed scan as well as in a high-speed scan. The image scanning method as shown in FIG. 6 may be performed in the image scanning apparatus 100 having the configuration of FIG. 1 as well as in image scanning apparatuses having other configurations.

The foregoing exemplary embodiments and advantages are merely exemplary and are not to be construed as limiting the present inventive concept. The exemplary embodiments can be readily applied to other types of apparatuses. Also, the description of the exemplary embodiments is intended to be illustrative, and not to limit the scope of the claims, and many alternatives, modifications, and variations will be apparent to those skilled in the art.

Although a few embodiments have been shown and described, it would be appreciated by those skilled in the art that changes may be made in these embodiments without departing from the principles and spirit of the invention, the scope of which is defined in the claims and their equivalents.

What is claimed is:

1. An image scanning apparatus including a shading patch on a scanning path, comprising:
    an image sensor configured to scan a manuscript; and
    a control unit configured to move the image sensor scanning path to scan the manuscript and to control the image sensor to scan the shading patch during moving of the image sensor,
    wherein the image sensor moves at different speeds in the shading patch and a manuscript region.

2. The image scanning apparatus as claimed in claim 1, further comprising a storage unit configured to store scanning data for the shading patch as reference data.

3. The image scanning apparatus as claimed in claim 1, further comprising an image processing unit configured to shading-correct scan data for the manuscript using scan data for the shading patch.

4. The image scanning apparatus as claimed in claim 3, further comprising a storage unit configured to store the shading-corrected scan data for the manuscript.

5. The image scanning apparatus as claimed in claim 1, wherein the control unit sequentially moves the image sensor to a home region, a shading patch region, and the manuscript region.

6. The image scanning apparatus as claimed in claim 5, wherein the control unit is configured to move the image sensor using different currents in the shading patch region and the manuscript region respectively.

7. The image scanning apparatus as claimed in claim 5, further comprising a storage unit configured to store a plurality of speed tables corresponding to a plurality of sections on the scanning path, respectively,
    wherein the control unit moves the image sensor using the plurality of speed tables.

8. The image scanning apparatus as claimed in claim 7, wherein each of the speed tables includes at least one of a first acceleration table configured to be increased to a preset first speed in units of preset speed, a first constant velocity table configured to maintain the first speed constantly, a second acceleration table configured to be increased to a preset second speed faster than the first speed in units of preset speed, and a second constant velocity table configured to maintain the second speed constantly.

9. The image scanning apparatus as claimed in claim 8, wherein the control unit is configured to move the image sensor using the first acceleration table when the image sensor moves from the home region to the shading patch region; move the image sensor using the first constant velocity table when the image sensor moves in the shading patch region; move the image sensor using the second acceleration table when the image sensor moves from the shading patch region to the manuscript region; and move the image sensor using the second constant velocity table when the image sensor moves in the manuscript region.

10. A method of scanning an image in an image scanning apparatus including a shading patch on a scanning path, the method comprising:
    moving an image sensor on a scanning path to scan a manuscript;
    scanning a shading patch during moving of the image sensor; and
    scanning the manuscript,
    wherein the image sensor moves at different speeds when scanning the shading patch and when scanning the manuscript.

11. The method as claimed in claim 10, further comprising storing scan data for the shading patch as reference data.

12. The method as claimed in claim 10, further comprising shading-correcting scan data for the manuscript using scan data for the shading patch.

13. The method as claimed in claim 12, further comprising storing the shading-corrected scan data for the manuscript.

14. The method as claimed in claim 10, wherein the moving includes sequentially moving the image sensor to a home region, a shading patch region, and a manuscript region.

15. The method as claimed in claim 14, wherein the moving the image sensor includes moving the image sensor using different currents in the shading patch region and the manuscript region respectively.

16. The method as claimed in claim 14, wherein moving the image sensor includes moving the image sensor using a plurality of pre-stored speed tables corresponding to a plurality of sections on the scanning path.

17. The method as claimed in claim 16, wherein each of the speed table includes at least one of a first acceleration table configured to be increased to a preset first speed in units of preset speed, a first constant velocity table configured to maintain the first speed constantly, a second acceleration table configured to be increased to a preset second speed faster than the first speed in units of preset speed, and a second constant velocity table configured to maintain the second speed constantly.

18. The method as claimed in claim 17, wherein the generating the driving signal includes:
    moving the image sensor using the first acceleration table when the image sensor moves from the home region to the shading patch region;
    moving the image sensor using the first constant velocity table when the image sensor moves in the shading patch region;
    moving the image sensor using the second acceleration table when the image sensor moves from the shading patch region to the manuscript region; and
    moving the image sensor using the second constant velocity table when the image sensor moves in the manuscript region.

* * * * *